United States Patent [19]

Kronogard et al.

[11] Patent Number: 4,470,261
[45] Date of Patent: Sep. 11, 1984

[54] GAS TURBINE PLANT FOR AUTOMOTIVE OPERATION

[75] Inventors: Sven-Olof Kronogård, Lomma; Clas-Olof Kronogård, Gråbo; Håkan Kronogård, Lund, all of Sweden

[73] Assignee: AB Volvo, Sweden

[21] Appl. No.: 294,527

[22] Filed: Aug. 20, 1981

[30] Foreign Application Priority Data

Sep. 29, 1980 [SE] Sweden ............... 8006806

[51] Int. Cl.³ .............................. F02D 25/04
[52] U.S. Cl. ................... 60/709; 60/39.142; 180/301
[58] Field of Search ............ 60/39.142, 39.15, 39.161, 60/39.163, 709, 718, 698, 719, 716; 180/301

[56] References Cited

U.S. PATENT DOCUMENTS 3,792,581 2/1974 Handa .................... 60/39.15 X
3,869,862 3/1975 Dickey .................... 60/39.15
4,183,420 1/1980 Kinoshita ................. 180/301

Primary Examiner—Stephen F. Husar
Attorney, Agent, or Firm—Cantor and Lessler

[57] ABSTRACT

At a low part load, and at idling of a vehicle machinery it is difficult to obtain a good fuel economy and acceptable emission rates. The amount of work for driving the compressor and the auxiliary apparatuses is considerable in a gas turbine, and in view of the conditions mentioned the combustor of the gas turbine is provided with two burners, of which one is dimensioned for a fuel quantity which merely corresponds to "spare-flame" operation. An auxiliary motor is included in the machinery and keeps together with the "spare-flame" burner, the main rotor of the gas turbine running at idling and part-load. The auxiliary motor may be an electric motor.

2 Claims, 1 Drawing Figure

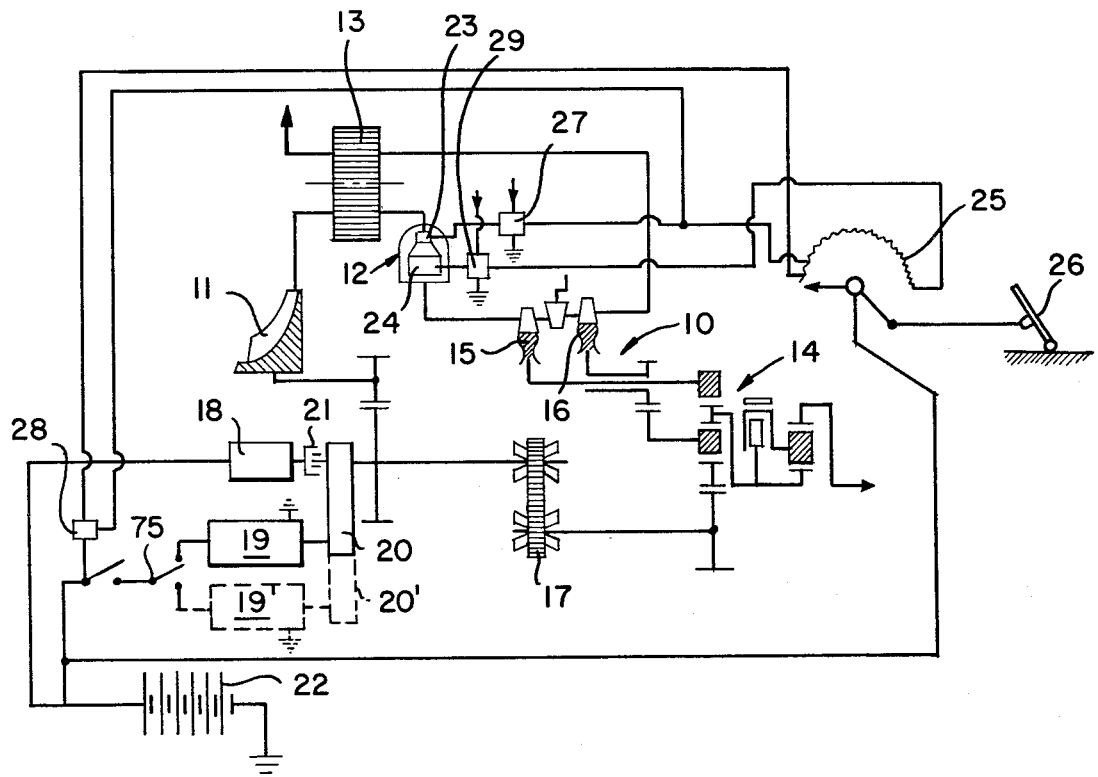

GAS TURBINE PLANT FOR AUTOMOTIVE OPERATION

BACKGROUND OF THE INVENTION

At a low part-load and idling it is difficult to achieve a good fuel economy and acceptable emission rates of a vehicle machinery. When said machinery comprises a gas turbine, the work for driving the compressor and auxiliary apparatuses is very heavy during said operation conditions.

For normal driving there should be a certain power available, and in order to counteract the above mentioned disadvantages at part load and idle running, it is proposed, according to the present invention, that the turbine, including its combustor, is so formed that at a low r.p.m. it is not able to drive the main rotor alone, i.e. the rotor comprising the compressor, as well as the auxiliary apparatuses. An additional motor, which may be of different types, is therefore arranged to supply the necessary additional power, which may be carried out with a satisfactory fuel economy and exhaust gas emissions.

SUMMARY OF THE INVENTION

A gas turbine plant according to the invention is characterized in that its combustor is provided with two burners, of which one is dimensioned for a fuel quantity which corresponds merely to "spare flame operation", whereby an auxiliary motor is arranged to keep the main rotor of the gas turbine running during such an operating condition. The auxiliary motor has a low power, and requires little space, but is so designed that it allows high, short term power extraction at start and acceleration. The auxiliary motor may be run by a battery which is chargeable during normal operation conditions. The generator and the battery are preferably oversized compared to what is needed at a conventional plant.

BRIEF DESCRIPTION OF THE DRAWING

In the drawing, the embodiment of the invention wherein the auxiliary motor is an electric motor is schematically shown.

DESCRIPTION OF SOME PREFERRED EMBODIMENTS

The gas turbine of the plant may be of any arbitrary known type, having one or more rotors. The gas tubine is denoted by 10, and traditionally the plant comprises a compressor 11 and a combustor 12. Not absolutely necessary, but advisable in view of fuel economy, a heat exchanger 13 is provided. The power is extracted via a gear box 14, which may be of any arbitrary known type, but preferably is of the planetary type.

In the embodiment shown, the turbine has two rotors 15 and 16, both of which are connected to the gear box 14. The compressor 11 is driven from the latter by way of a belt transmission 17. The auxiliary apparatuses, comprising i.a. the generator 18, and the starting motor 19, are connected to said transmission.

The starting motor 19 which has a larger capacity than in a normal motor plant, is connected via a transmission 20, and the generator 18 is connected via a free-wheel 21. A battery, which also has a larger capacity than in a normal vehicle plant, is denoted by 22.

The generator 18 may be driven via one or more freewheels, for instance also from the output shaft of the turbine/transmission system according to the principle "highest speed wins". At "coasting", i.e. when the throttle pedal is released and the vehicle drives the motor plant, braking energy may be stored in the battery via the generator.

Instead of a larger electric motor 19 it is possible to have two motors 19 and 19' connected in parallel, which are alternatively switched in, via switch 75, with different gearing ratios through transmission 20, 20', so that one drives at starting, and the other during acceleration. An advantage of such an arrangement is that it is possible to use standard starting motors.

The combustor 12 is provided with a "spare flame burner" 23, and an ordinary burner 24, dimensioned for full power. The spare flame burner 23 does not produce a sufficient amount of gas for driving the compressor and the necessary auxiliary apparatuses, (not shown). When idling and at low part load the auxiliary motor 19 has to be activated. The spare flame burner, however, maintains the gas turbine heated, ready for quick acceleration.

A very schematically shown control system comprises a rheostat 25, which is affected by the throttle pedal 26 of the vehicle. Within a first region of the rheostat 25 the fuel pump 27 of the "spare-flame"-burner 23 is connected and a switch 28 for the auxiliary motor is closed. Within a further, and substantial portion of the rheostat 25, the fuel pump 29 of the main burner 24 is activated, so that a fuel amount according to the instant need is supplied.

The embodiment which has been described above and is shown in the drawing is merely an example, and the components included therein may be varied in many ways within the scope of the accompanying claims.

With the plant according to the invention it is possible to obtain a fuel consumption of a gas turbine plant at idling, which is less than one half of that of a present day diesel engine, and at least 30-50% lower than the consumption of the diesel engine during an operating cycle, which meets the requirements concerning emission and performance.

What we claim is:

1. In a gas turbine plant for automotive operation, having at least one turbine rotor, a compressor, conventional auxiliaries and a combustor, the improvement comprising said combustor being provided with first and second burners, said first burner being dimensioned for a fuel quantity corresponding merely to "spare-flame" operation, said second burner being dimensioned for full power operation, and said plant further comprising an auxiliary motor means connectable to said at least one rotor and control means for maintaining said auxiliary motor means and said first burner only operative to maintain said at least one turbine rotor rotating during part load and idle running and for maintaining said second burner operative at other times, said auxiliary motor being an electric motor which is supplied with current from a battery chargeable during normal operating conditions by a generator in said conventional auxiliaries.

2. The gas turbine plant according to claim 1, in which said auxiliary motor comprises two electric motors, operating in parellel, and gearing with varying ratios for alternate drive of said at least one rotor.

* * * * *